US010948279B2

(12) United States Patent
Ardesi et al.

(10) Patent No.: US 10,948,279 B2
(45) Date of Patent: Mar. 16, 2021

(54) DEVICE AND METHOD FOR THE HOT MEASURING, DURING ROLLING, OF A SIZE OF METAL PROFILES

(71) Applicant: DANIELI AUTOMATION S.P.A., Buttrio (IT)

(72) Inventors: Alessandro Ardesi, Udine (IT); Antonello Mordeglia, Bangkok (TH)

(73) Assignee: DANIELI AUTOMATION S.P.A., Buttrio (IT)

( * ) Notice: Subject to any disclaimer, the term of this patent is extended or adjusted under 35 U.S.C. 154(b) by 315 days.

(21) Appl. No.: 15/752,216

(22) PCT Filed: Aug. 10, 2016

(86) PCT No.: PCT/IB2016/054818
§ 371 (c)(1),
(2) Date: Feb. 12, 2018

(87) PCT Pub. No.: WO2017/025911
PCT Pub. Date: Feb. 16, 2017

(65) Prior Publication Data
US 2020/0208956 A1    Jul. 2, 2020

(30) Foreign Application Priority Data

Aug. 10, 2015 (IT) .................. 102015000043713

(51) Int. Cl.
*G01B 7/06* (2006.01)
*G01R 33/12* (2006.01)
*G01B 7/12* (2006.01)

(52) U.S. Cl.
CPC .............. *G01B 7/107* (2013.01); *G01B 7/125* (2013.01)

(58) Field of Classification Search
CPC . G01B 7/06; G01B 7/12; G01B 7/105; G01B 7/107; G01B 7/312; G01N 27/902;
(Continued)

(56) References Cited

U.S. PATENT DOCUMENTS 2,065,118 A * 12/1936 Davis, Jr. ........... G01N 27/9033
                                                                324/241
3,693,075 A    9/1972 Forster
(Continued)

FOREIGN PATENT DOCUMENTS

WO    WO-88/06268 A1    8/1988
WO    WO-2013/190360 A1    12/2013

OTHER PUBLICATIONS

International Search Report and Written Opinion for PCT/IB2016/054818, dated Dec. 14, 2016.
(Continued)

*Primary Examiner* — Minh N Tang
(74) *Attorney, Agent, or Firm* — Marshall, Gerstein & Borun LLP (57) ABSTRACT

A device for the hot measuring, during rolling, of a transverse size of a metal profile (12) includes a transmission element with at least two sections distinct and spatially separated from each other and disposed along a nominal axis of feed of the metal profile, configured to generate an electromagnetic field with a desired profile of force lines, and a reception element disposed along the nominal axis in a position comprised in the overall longitudinal bulk of the transmission element (14) and configured to detect a signal relating to the variations of the electromagnetic field due to the passage of the metal profile.

13 Claims, 3 Drawing Sheets

(58) Field of Classification Search
CPC ............. G01N 27/904; G01N 27/9026; G01N 27/9046
See application file for complete search history.

(56) References Cited

U.S. PATENT DOCUMENTS 6,661,224 B1 * 12/2003 Linder ................... G01B 7/003
324/227
2009/0309589 A1 * 12/2009 Ciani ................ G01N 27/9026
324/238

OTHER PUBLICATIONS

International Preliminary Report on Patentability for PCT/IB2016/054818, dated Nov. 24, 2017.
International Search Report and Written Opinion for PCT/IB2016/054817, dated Dec. 14, 2016.
International Preliminary Report on Patentability for PCT/IB2016/054817, dated Nov. 10, 2017.

* cited by examiner

DEVICE AND METHOD FOR THE HOT MEASURING, DURING ROLLING, OF A SIZE OF METAL PROFILES

FIELD OF THE INVENTION

The present invention concerns a device for the hot measuring, during rolling, of a transverse size of metal profiles, for example steel bars or tubes.

In particular, the present invention concerns a device that can be used to measure both the external diameter, in the case of bars and tubes, and also the mean and local thickness in the case where the metal profile is a tube.

BACKGROUND OF THE INVENTION

It is known to produce metal profiles such as steel tubes and/or bars by hot rolling. To control the rolling process it is useful to know, as the process is performed, a transverse size of the metal profiles, for example the mean diameter in the case of bars and/or the mean diameter and thickness in the case of tubes. This allows to intervene quickly to adjust the rolling process in order to obtain metal profiles with the desired diameter and/or thickness, as constant and uniform as possible.

It is known to make tubular elements starting from a full profile and making the axial hole by means of a mandrel. The subsequent step consists of reducing the section size of the desired tubular element. This operation is normally carried out by passing the tubular element thus obtained through one or more rolling stands.

This process can cause mainly two types of problem in the quality of the tubular element, both connected to a deviation in thickness.

A first problem concerns a deviation in thickness due to the eccentricity of the mandrel, when the axial hole is being made, with respect to the nominal section of the tubular element to be made.

A second problem concerns a deviation in thickness not due to any eccentricity between hole and section but due to localized circumferential variations in the thickness of the tubular element.

The deviation in thickness has a negative influence on the quality of the work. Moreover, the resistance and performance of the metal profile can also be influenced during use.

Different devices and methods are known, to measure a size of metal profiles, in particular a transverse size, directly and without contact, during hot rolling.

For example, devices are known that use a radiographic method, based on the use of gamma rays produced by radioactive sources. This method provides to use one or more pairs of radioactive sources and one or more radiation detectors. According to the radiation captured by the radiation detectors after the tubular element has passed through, an electric current is generated that is processed and digitalized by a measurement transducer and subsequently sent to a central processing system to calculate the thickness of the wall of the tubular element.

One disadvantage of such devices is the high costs and safety problems deriving from the use of radioactive substances and the subsequent disposal procedure.

Devices for measuring a transverse size are also known, which provide to use ultrasonic laser technology. In this case, a transmitter probe emits a pulsed laser beam which generates an ultrasonic wave, which is propagated from outside to inside the thickness of the metal profile, is reflected by the internal surface of the tubular element and returns toward the external surface. A laser interferometer determines the time taken by the ultrasonic wave to pass and, once the speed of propagation of the ultrasonic wave is known, the device is able to detect the thickness of the metal profile as a function of the passing time measured.

One disadvantage of ultrasonic laser devices is that they need an angular scan, and must therefore provide to move and partly rotate the support parts of the probes, to obtain the detection of the measurement on several surface portions of the metal profile to cover the entire circumference.

Another disadvantage of this technique is the sensitivity of the detection with respect to the position of the transmitter and receiver probes. Furthermore, the devices are generally rather expensive and difficult to manage and maintain.

Electromagnetic measuring devices with parasitic currents are also known. One or more transmission coils are generally used, which generate a magnetic field and one or more reception coils which detect the variations in the magnetic field induced. One disadvantage of known electromagnetic devices is that the measurement greatly depends on the relative position of the metal profile and sensor.

Another disadvantage of electromagnetic measuring devices with parasitic currents is that the measurement of a transverse size of a metal profile is influenced by the conductivity of the metal material of the profile measured. For this reason measuring devices with parasitic currents require specific and different calibrations according to the conductivity of the material of the profiles to be measured.

WO 2013/190360 describes an apparatus to detect the deviation in thickness in a section of a tubular metal element. The apparatus consists of at least three sensors of the electromagnetic type, each comprising a transmission coil and a reception coil, disposed distanced around the circumference of the tubular metal element which is measured. The transmission coil and the reception coil are disposed outside the wall of the tubular metal element measured. In this document, it is advantageous to provide that each of the sensors, which incorporates both the transmission and the reception coil, is associated with a respective rolling ring.

This document provides that there can be measurement apparatuses associated with each rolling stand, to perform the measurement simultaneously with each reduction in section. For each measurement on the same section, however, each measurement apparatus provides that each electromagnetic sensor operates on an angular portion of the section, for example 120° in the case of three sensors, to detect the local thickness of the tubular metal element. By comparing the three detections an indication is obtained if the thickness of the tubular metal element is constant or not over the whole circumference. The document does not provide that the transmission and reception coils that operate on the same measurement of the nominal section of the tubular metal element are located distanced from each other along the axis of the tubular element.

U.S. Pat. No. 3,693,075 describes a system and an apparatus to detect defects, eccentricity and wall thickness of tubular metal elements. The apparatus has a primary coil that emits an electromagnetic field that generates parasitic currents on the surface of the tubular metal element, and a secondary coil that detects the parasitic currents to obtain the desired information.

The primary coil and secondary coil are substantially in axis with respect to each other and disposed respectively on opposite sides with respect to the wall of the tubular metal element which is measured.

One purpose of the present invention is to provide a device for measuring the diameter and/or thickness of bars and tubes which allows to make the measurement under hot conditions efficiently, with a device that is inexpensive and easy to manage.

Another purpose of the present invention is to provide a measuring device that allows to make the measurement independently of the position of the metal profile inside the measuring device used.

Another purpose is to provide a measuring device that is independent of the conductivity of the material measured.

Another purpose is to obtain a measuring device that is substantially independent both of the speed and also of the temperature of the metal profile and/or the particular type of material used, if the material is not ferromagnetic, for example for non-ferrous metals or stainless steels, and which is independent of the speed and temperature when the latter is above Curie temperature, in the case of other types of materials.

Another purpose of the present invention is to provide a measuring device that can measure the local thickness of a metal profile, such as a tube, in different angular positions simultaneously.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a device is provided for the hot measuring, during rolling, of a transverse size of metal profiles, such as for example solid bars or tubes.

According to the present invention, the device for the hot measuring, during rolling, of a transverse size of metal profiles comprises a transmission element with at least two sections distinct and spatially separated from each other disposed along a nominal axis of feed of a metal profile, and operating on the same nominal measurement of transverse size, wherein the transmission element is configured to generate a magnetic field with a desired profile of its force lines; the device also comprises a reception element disposed along the same nominal axis of feed of the metal profile in a position comprised in the overall longitudinal bulk of the transmission element and configured to detect a signal relating to the variations of the magnetic field generated by the transmission elements and due to the passage of a metal profile.

Both the transmission element and the reception element have a section shape, advantageously but not necessarily circular, defining a transit hole of a larger size than the diameter of the metal profile on which the measurement is performed, and inside which the metal profile is made to transit.

The expression "in a position comprised in the overall longitudinal bulk of the transmission element" means that the reception element is disposed, in the direction of feed of the metal profile, always in an intermediate position between two transmission elements, and in any case contained longitudinally inside the extremes defined by the transmission elements. Thanks to this configuration, the force lines of the fields transmitted by the transmission elements can be conveyed optimally on the reception element, and not dispersed outside, making the measurement extremely effective and precise.

The expression "operating on the same nominal measurement of transverse size" means that the two sections of the transmission element are disposed spatially separate from each other along the axis of feed of the metal profile but between them no reduction in section of the metal profile takes place; therefore, although they operate on two distinct sections of the metal profile, the two sections have the same nominal transverse size.

According to some embodiments, the transmission element and the reception element are substantially coaxial to each other along the nominal axis of feed of the metal profile.

In a possible embodiment, the transmission element and the reception element can each consist of a coil or solenoid with an extension along the nominal axis of feed of the metal profile.

According to some embodiments, the radiuses of the coils that make up the transmission element and the reception element are substantially identical to each other.

According to some embodiments, the reception element consists of a single section.

According to a variant embodiment, the reception element consists of two or more sections distinct and spatially separated from each other and disposed along the nominal axis of feed of the metal profile.

According to some embodiments, the transmission element is configured to generate an electromagnetic field with a desired profile of its force lines, so that the reception element substantially detects, at the moment the metal profile passes through said field, a flow value of magnetic field that allows a correct detection of the external diameter and/or mean thickness of the metal profile measured, irrespective of the alignment of the metal profile with respect to the nominal axis of feed and therefore irrespective of the position of the profile inside the field.

According to some embodiments, the device comprises reception coils disposed segmented on the circumference and corresponding to the sectors obtained by dividing a circular crown into equal parts, so as to be able to detect a different measurement of the flow of magnetic field for each segmented reception coil and to be able to assess the local thickness of metal profiles and the possible eccentricity.

In this way, advantageously, with a single measuring device and with a simultaneous measurement, it is possible to assess both the external diameter and also the mean and local thicknesses of tubular metal profiles.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We shall now refer in detail to the various embodiments of the present invention, of which one or more examples are shown in the attached drawing. Each example is supplied by way of illustration of the invention and shall not be understood as a limitation thereof. For example, the characteristics shown or described insomuch as they are part of one embodiment can be adopted on, or in association with, other embodiments. It is understood that the present invention shall include all such modifications and variants.

FIGS. 1-9 are used to describe embodiments of a device 10 for hot measuring a transverse size of metal profiles 12. In the present description the definition "metal profiles" means elements having a transverse size much smaller than their longitudinal development, such as steel bars or tubes for example.

The device 10 can be used to measure the transverse size of metal profiles 12 in transit and can be disposed, for example, in an inter-stand segment, that is, between two successive rolling stands, or at the end of the rolling process to measure the final size of the product obtained.

Figure 2:
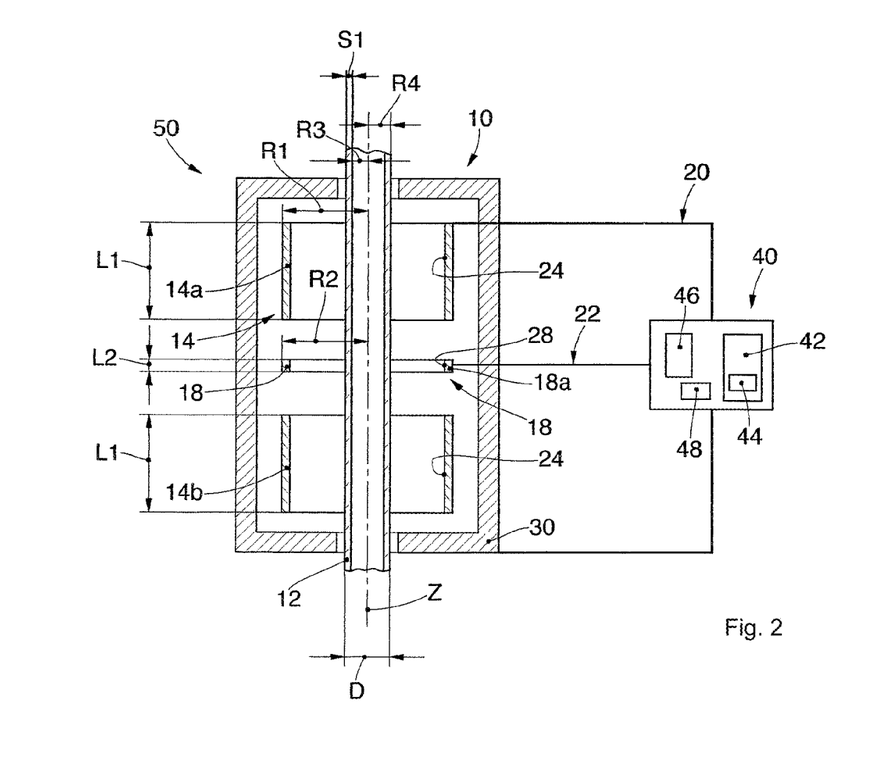
FIG. 2 is a section view of a device for the hot measuring of a size of metal profiles in accordance with embodiments described here.

FIG. 2 is used to describe embodiments of an apparatus 50 for hot measuring, during rolling, a transverse size of metal profiles 12 comprising the device 10 and a control and command unit 40.

The control and command unit 40 can be configured both to feed the device 10 with the electric energy it needs for functioning, and also to process the signals detected by the device 10.

FIGS. 1-7 are used to describe embodiments of a measuring device 10 comprising a transmission element 14, having at least two sections, but there can also be 3, 4 or more—14a, 14b, 14c, 14d—distinct and spatially separated from each other, configured to generate an electromagnetic field, and a reception element 18, located in an intermediate position in the overall bulk of the transmission element 14. According to some embodiments, the reception element 18 can have one or more sections 18a, 18b, distinct and spatially separated from each other.

The transmission element 14 and the reception element 18 are disposed, substantially aligned and coaxial with respect to each other, along a nominal feed axis Z of the hot metal profile 12 in transit, arriving from rolling or other type of hot deformation.

Both the transmission element 14 and the reception element 18 have an advantageously, but not necessarily, circular section, defining a transit hole for the metal profile 12.

The transmission element 14 and reception element 18 have respective internal surfaces 24, 28, which define a transit volume of the metal profile 12, inside which the force lines of the electromagnetic field generated by the transmission element 14 are disposed substantially parallel to the nominal feed axis Z of the metal profile 12.

The reception element 18 is configured to detect the variations in the reaction electromagnetic field, generated by the currents induced on the metal profile 12, due to the passage of the metal profile 12 inside the electromagnetic field generated by the transmission element 14.

Figure 1:
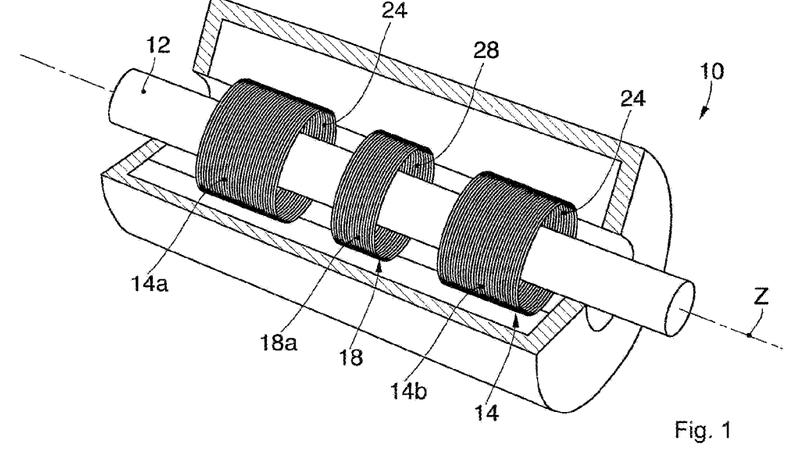
FIG. 1 is a partly sectioned perspective view of a device for the hot measuring of a size of metal profiles in accordance with embodiments described here.

According to embodiments described using FIGS. 1 and 2, a transmission element 14 can be provided having two distinct sections 14a, 14b and a reception element 18 having a single section 18a disposed in an intermediate position between the two sections 14a, 14b of the transmission element 14.

Figure 3:
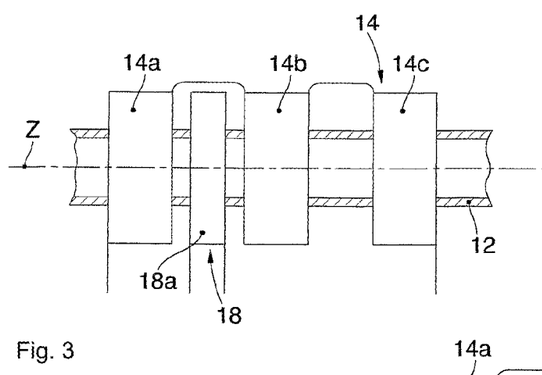
FIG. 3 is a schematic view of one part of a device for the hot measuring of a size of metal profiles in accordance with embodiments described here.

According to embodiments described using FIG. 3, a transmission element 14 can be provided that is divided into three distinct sections, 14a, 14b, 14c, and a reception element 18 with a single section 18a positioned drowned inside the central section 14b of the transmission element 14.

Figure 4:
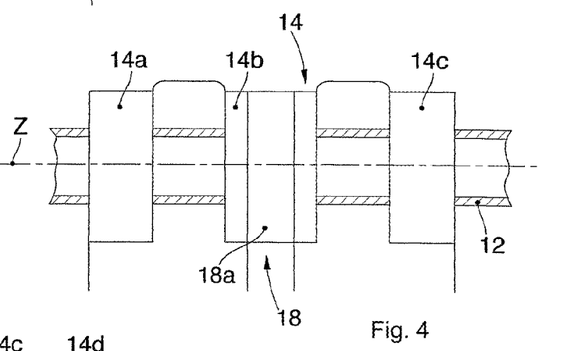
FIG. 4 is a schematic view of one part of a device for the hot measuring of a size of metal profiles in accordance with variant embodiments described here.

According to possible variant embodiments described using FIG. 4, a transmission element 14 can be provided that is divided into three distinct sections, 14a, 14b, 14c, and a reception element 18 with a single section 18a disposed in an intermediate position, for example between two sections 14a, 14b of the transmission element 14.

Figure 5:
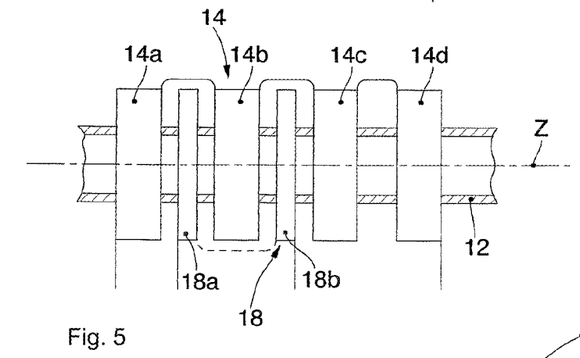
FIG. 5 is a schematic view of one part of a device for the hot measuring of a size of metal profiles in accordance with other variant embodiments described here.

According to other variant embodiments described using FIG. 5, a transmission element 14 can be provided that is divided into four distinct sections, 14a, 14b, 14c, 14d, and a reception element 18 divided into two sections 18a, 18b disposed in an intermediate position between adjacent pairs of sections 14a, 14b, 14c of the transmission element 14.

According to other variant embodiments, not shown in the drawings, a transmission element 14 can be provided that is divided into more than four distinct sections and a reception element 18 divided into more than two distinct sections, positioned between adjacent portions of the transmission element 14, or drowned inside a section of the transmission element 14.

According to embodiments described using FIGS. 1 and 2, the transmission element 14 and the reception element 18 can be coils, or spirals of a substantially cylindrical shape, with respective radiuses R1 and R2.

The transmission element 14 can consist of a spiral or coil with an overall extension L1 along the nominal axis Z, greater in size than an overall extension L2 of the reception element 18.

According to embodiments described using FIG. 2, radius R2 of the reception element 18 is substantially equal to radius R1 of the transmission element 14.

According to variant embodiments, radius R2 of the reception element 18 can be bigger or smaller than radius R1 of the transmission element 14.

According to some embodiments, the sizes of the transmission element 14, in particular the length L1, radius R1 and/or number of spirals of the coil, can be suitably chosen so that the electromagnetic field generated by the transmission element 14 has a predetermined profile. The profile of the electromagnetic field is designed so that the measurement of the size of the metal profile 12 that passes through it does not depend on its position with respect to the nominal axis Z.

Figure 6:
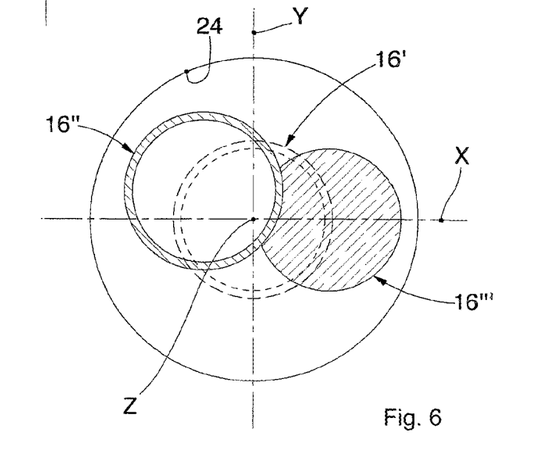
FIG. 6 is a cross section view of a device for the hot measuring of a size of metal profiles.

FIG. 6 is used to show possible positions of a metal profile 12 inside the device 10. A possible position is the one indicated by number 16', which corresponds to a position perfectly aligned along the nominal axis Z, in which the metal profile 12 is perfectly coaxial to the device 10.

Numbers 16" and 16'" indicate possible positions in which the metal profile 12 or a portion of it can be found as it passes through the device 10, in which positions the metal profile 12 is eccentric with respect to the device 10. In particular, the real axis of feed of the metal profile 12 may not coincide with the axis of the transmission element 14 and reception element 18, which would distort the measurement of the device 10 and make it imprecise and unreliable.

It can also be seen that, depending on the size of the metal profile 12 being measured, the index of relative filling of the metal profile 12 and the internal surfaces 24, 28 of the transmission element 14 and the reception element 18 may increase or decrease.

By index of relative filling we mean the ratio between the area defined by the metal profile 12 intersecting a plane (X, Y) perpendicular to the nominal axis Z and the area defined by the internal surfaces 24, 28 on the same plane (X, Y). The lower the value of the index of relative filling, the greater the probability that the metal profile 12 will be misaligned, during measurement, with respect to the nominal axis Z, and the greater the distance of the center of the metal profile 12 from the nominal axis Z.

When the index of relative filling has a low value, the precision and sensitivity of the measuring device 10 is consequently reduced.

Using the geometric configuration described above, with the generation of an electromagnetic field with a profile of the force lines having a desired longitudinal development, allows to make the position of the metal profile 12 with respect to the axis of the transmission element 14 and reception element 18 substantially non influential.

Therefore, the measurement is reliable, precise and repeatable for any measurement of the metal profile 12 in the range of measurements compatible with the size of the transmission element 14 and reception element 18, in particular with the size of the respective axial holes.

A current 20 passes through the transmission element 14, which induces the generation of an electromagnetic field inside the volume defined by the internal surfaces 24, 28.

The electromagnetic field generated by the current 20 circulating in the transmission element 14 induces parasitic currents, mainly azimuth, in the metal profile 12. The parasitic currents in turn generate a reaction field, which can be detected by means of its flow concatenated by the reception element 18, at the heads of which an electromotive force occurs. A signal 22 relating to the electromotive force can be sent to the control and command unit 40 to be subsequently processed so as to obtain the measurement of thickness and diameter.

According to other embodiments, the transmission element 14 can be designed so that the electromagnetic field generated has a profile such that the reaction field measured by the reception element 18 is substantially independent of the position of the metal profile 12 inside the device 10.

By suitably processing the signals relating to the electromotive force 22 and the current 20, it is possible to assess both the mean thickness S1, generally indicated by WT (Wall Thickness) of a metal profile 12 along the circumference, if the metal profile 12 is a tube, and also the external diameter D, or OD (Outer Diameter) if the metal profile 12 is a tube or bar.

Advantageously, the device 10 according to the present invention can therefore be used during the hot rolling process to measure a transverse size of both tubes and bars.

Figure 7:
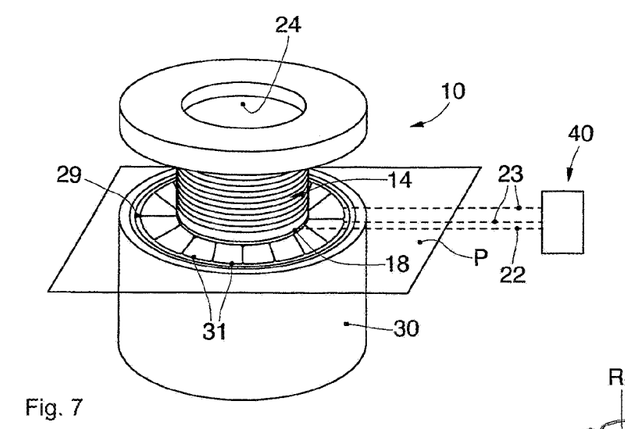
FIG. 7 is a partly sectioned perspective view of a device for the hot measuring of a size of metal profiles in accordance with other embodiments described here.

According to embodiments described using FIGS. 1, 2 and 7, the device 10 can comprise a casing 30 that surrounds at least the transmission element 14 and the reception element 18, which can function as a screen, so as to prevent the magnetic field from inducing currents outside the device 10 as well.

According to embodiments described using FIG. 7, the measuring device 10 can also comprise a thermostat system 29, configured so as to keep the size and conductivity of the casing 30 substantially uniform, and in any case within acceptable tolerance limits, stabilizing the temperature of the casing 30 which influences them.

According to other embodiments, the device 10 can comprise reception devices, or reception coils 31, configured as segments. According to embodiments described using FIGS. 7 and 8, the reception coils 31 can be coils with a segmented shape, corresponding to the sectors obtained by dividing a circular crown into equal parts, disposed around the reception element 18.

Figure 8:
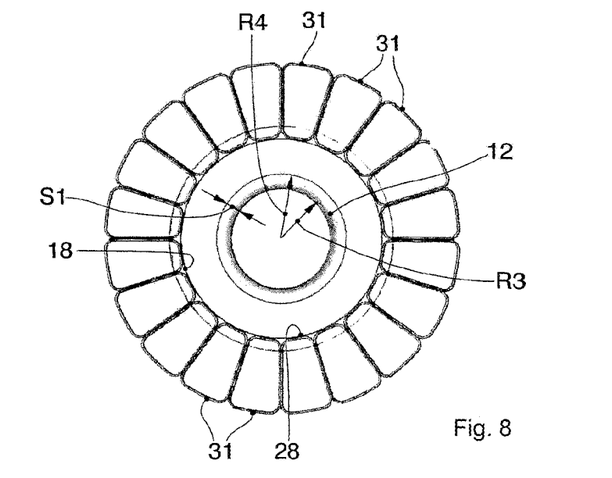
FIG. 8 is a section along the section plane P of FIG. 7.

Since the segmented reception coils 31 are positioned around the reception element 18, and since the flow of the magnetic field through the internal surface 28 of the reception element 18 is the same that passes through the infinite surface external to it, only a part of the flow of magnetic field passes through each segmented reception coil 31. In particular, the flow that passes through each segmented reception coil 31 is at least partly determined by the characteristics of the portion of metal profile 12 facing it.

According to embodiments described using FIGS. 7 and 8, twenty segmented coils 31 can be provided, each corresponding to a circular sector of 18°.

Figure 9:
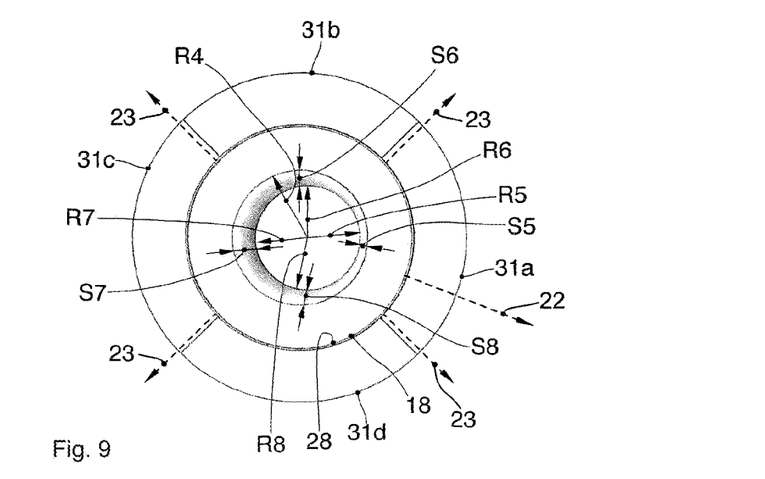
FIG. 9 is a section along the section plane P of FIG. 7 in accordance with other embodiments described here.

According to a variant embodiment described using FIG. 9, four segmented coils 31 can be provided, indicated for example by the numbers 31a, 31b, 31c, 31d, each corresponding to a circular sector of 90°.

According to other variant embodiments, any number whatsoever of segmented coils 31 can be provided, comprised between two and twenty, or even more than twenty.

According to some embodiments, the segmented reception coils 31 can be serially connected in groups to constitute measuring coils, each consisting for example of two, three, four, five or more segmented coils 31. According to embodiments described by way of non-restrictive example with reference to FIG. 9, by means of the four segmented coils 31a, 31b, 31c, 31d it is possible to detect four different magnetic field flows, each relating to an angular sector of the metal profile 12 measured, in this case for example, four flows relating to arcs of circumference of 90°.

In this way it is advantageously possible to assess also the local thickness of a metal profile 12, in this case a tube, along its circumference. In fact, a single simultaneous measurement is made on the field flows concatenated with the reception element 18 and the segmented coils 31a, 31b, 31c, 31d, and the data are processed to obtain the information concerning the measurements of diameter and thickness.

In particular, the external diameter D and the mean thickness S1 and local thickness are evaluated by the control and command unit 40 processing the signal 22 received, which signal relates to the electromotive force generated at the heads of the reception element 18.

This allows to detect deviations in thickness of the tubular metal profile 12 due for example to the eccentricity of the mandrel or undulation defects of the so-called "daisy" type.

The control and command unit 40 can be used to implement a method for hot measuring a transverse size of metal profiles.

The measuring method according to the present invention comprises a procedure relating to the calibration of the device 10 and a procedure relating to the implementation of a calculus algorithm to detect the values of quantities desired.

According to some embodiments, the control and command unit 40 comprises a feed unit 42 configured to supply the transmission element 14 with the current 20 necessary for the induction of a longitudinal electromagnetic field.

The feed unit 42 can comprise a source for feeding electric energy 44, for example a connection to the traditional electric network, or a system to accumulate electric energy.

According to some embodiments, the current 20 feeding the elements that generate the electromagnetic field can be an alternate current with a multi-frequency spectrum, obtained by overlapping at least two sinusoidal currents having different frequencies F1, F2, of which the first frequency F1 is much greater than the second frequency F2.

According to some embodiments, three or more frequencies can be provided, which can be used for example to find other information concerning the geometry of the metal profile 12 to be measured, or to self-calibrate the device 10, and/or to eliminate the common modes of the reaction field.

According to some variant embodiments, it may be provided, for example if the metal profile 12 to be measured is a bar, to use two frequencies that are very close to each other, so as to be able to detect a possible ovalization of the metal profile 12.

According to some embodiments that provide to use two frequencies F1, F2 of which one is greater than the other, the first bigger frequency F1 can be chosen so that the depth of penetration corresponding to it for the conductivity expected and for the range of metal profiles 12 to be measured is much lower than an expected minimum thickness.

According to some embodiments, the second lower frequency F2 can be chosen so that the depth of penetration corresponding to it is in a determinate ratio with the expected thickness for the given format of a metal profile 12 currently being measured, so as to optimize the variations in modulus and phase of the signal 22 detected relating to the electromotive force.

According to some embodiments, the control and command unit 40 also comprises a processing unit 46, configured to process the signal 22 detected and to implement a calculus algorithm to obtain at least the values of diameter D, mean thickness S1 and local thickness of the metal profile 12 measured.

According to some embodiments, the processing unit 46 can be any data processing system whatsoever, a controller, microcontroller, processor or microprocessor usable in the control field.

According to some embodiments, the control and command unit 40 can also comprise a data storage unit 48, configured to memorize the data received from the device 10 to be processed, and the parameters needed to calibrate the device 10.

The signal 22 relating to the electromotive force is detected by the reception element 18 and can be amplified by a high impedance entrance circuit to be subsequently digitalized and processed by the processing unit 46.

The calculus algorithm provides a first phase of synchronous demodulation of the signal 22 relating to the electromotive force and the signal of the current 20, which identifies the moduli and phases of the components of the signal 22 for each of the frequencies of the current 20 set. In the same way, a voltage signal proportional to the current 20 is amplified, digitalized and processed by a digital synchronous processor.

A second phase of the algorithm provides to find the "phasor" of the flow of the magnetic field from the value of the electromotive force induced, with the frequencies of the current 20 set being known.

The term "phasor" means a complex number representable as vector in the complex plane that represents the Steinmetz transform of a well-defined pulsation sinusoidal function.

A third phase of the algorithm provides to normalize the value of the flow of the magnetic field obtained in the previous phase with respect to the corresponding phasor of the current. In this way the effect of possible variation is eliminated, due for example to the thermal drift of the impedance of the transmission element 14.

Subsequently, a second normalization is carried out, so as to non-dimensionalize the value of flow of the magnetic field, using a reference value relating to a normalized flow obtained without a metal profile 12 inside the device 10. The value of normalized flow without a metal profile 12 inside the device 10 can be obtained during the calibration step of the device 10 and memorized in the data storage unit of the control and command unit 40.

This pass allows to de-constrain the processing of the data from the physical parameters of the measuring device 10 and to return to a non-dimensional mathematical model.

The algorithm also provides a fourth phase of defining an ideal theoretical model used to calculate, starting from the normalized and non-dimensionalized flows, the value of the flow of the magnetic field in the reception element 18 as a function of the mean external radius R4, the mean internal radius R3 and the conductivity 6.

To calculate the value of flow of the magnetic field, a homographic transformation is also carried out, so as to determine a correspondence between the real non-dimensionalized phasors previously calculated and the non-dimensional phasors of the ideal model. The definition "homographic transformation" means a consistent transformation, which has the properties to put in biunivocal relation the points of two projective spaces of the same size, such that the shapes of one space are the same kind as the corresponding shapes of the other.

The parameters needed to perform the homographic transformation can be found by calibrating the device 10, in particular by a first level of calibration, which will be explained in more detail hereafter.

The measurement algorithm provides a fifth phase in which the normalized values of the flow measured by means of the homographic transformation are transformed into the corresponding ideal values.

The component to the first higher frequency F1 of the ideal flow is processed by the processing unit 46, which implements a suitable resolution algorithm to find the mean external radius R4 of the metal profile 12 being measured.

The component to the second lower frequency F2 of the ideal flow is processed by the processing unit 46, which implements a suitable resolution algorithm to find the mean internal radius R3 of the metal profile 12 being measured.

Finally, in phase six, the value of the mean thickness S1 can be calculated from the difference between the value of the mean external radius R4 and the value of the mean internal radius R3.

Advantageously, knowing the value of the mean external radius R4, the value of the external diameter D can also easily be calculated. The measuring device 10 can therefore also be used to measure the external diameter D of a solid bar.

If the metal profile 12 is a tube, the calculus algorithm can also provide phases to process the signal received to calculate the local thickness of the metal profile 12 being measured, using signals 23 relating to the flows of field detected by the segmented coils 31, 31a, 31b, 31c, 31d. In particular, a value of eccentricity of the metal profile 12 can be estimated.

While the flow obtained on the reception element 18 is not appreciably affected by a possible misalignment of a metal profile 12 to be measured with respect to the nominal axis Z, the flow obtained on the segmented reception coils 31, 31a, 31b, 31c, 31d can be influenced by the position of the metal profile 12 with respect to the segmented reception coils 31, 31a, 31b, 31c, 31d themselves. In fact, the closer the metal profile 12 is to a segmented reception coil, 31, 31a, 31b, 31c, 31d, the more the segmented reception coil 31, 31a, 31b, 31c, 31d is concatenated with a greater portion of the reaction flow produced by the parasitic currents induced in the metal profile 12.

The calculus algorithm to determine the local thickness provides a first phase of compensating the position of the metal profile 12 inside the measuring device 10, which is carried out by exploiting the symmetry of the effect of the position on two opposite segmented coils 31, 31a, 31b, 31c, 31d, for example on segmented coils 31a and 31c (FIG. 9). According to some embodiments, the flow values detected by the segmented coils 31, 31a, 31b, 31c, 31d are reported on a complex plane. Since the points on the complex plane representing said flows move along a straight line as the direction and entity of the misalignment varies, the aim of the compensation is to move the point relating to a determinate segmented coil 31, 31a, 31b, 31c, 31d, obtained for a certain misalignment, to the point which would be obtained with the metal profile 12 perfectly centered on the nominal axis Z.

To determine how to move the point, it is possible to exploit the symmetry between two opposite segmented coils 31, 31a, 31b, 31c, 31d and to consider, for each pair, a difference vector between the two points relating to the concatenated flows of the segmented coils 31, 31a, 31b, 31c, 31d on the complex plane. The modulus of the difference vector considered quantifies the distance between the points, while the direction coincides with the straight line on which the points move. The point we would have if the metal profile 12 were centered, thanks to symmetry, is half-way between the two points relating to the concatenated flows of each pair of opposite segmented coils 31, 31a, 31b, 31c, 31d. In the case of FIG. 9 for example, if the concatenated flows of the segmented coils 31a, 31c are considered, it is sufficient to subtract half of the difference vector, calculated between the points of the flows detected of the segmented coils 31a, 31c identified on the complex plane, from the flow detected by the segmented coil 31a, in order to obtain the compensated value of the flow for the segmented coil 31a.

According to some embodiments, to compensate the position it is possible to use a parameter obtained by a second level of calibration, explained in more detail hereafter in the description.

The calculus algorithm also provides a first phase in which a signal 23 relating to the electromotive force induced at the heads of each segmented coil 31, 31a, 31b, 31c, 31d is processed in the same way as described previously with regard to the signal 22 detected by the reception element 18, until a value of normalized, non-dimensionalized flow, relating to an ideal model for each of the frequencies used is obtained for each signal.

The parameters needed for normalization and homographic transformation, in this case too, can be obtained by the first level of calibration, performed for each segmented coil 31, 31a, 31b, 31c, 31d.

In a subsequent phase, described for example using FIG. 9, the calculus algorithm provides to find, for each segmented coil 31a, 31b, 31c, 31d, the internal radiuses R5, R6, R7, R8 and hence the value of the mean internal radius R3 as the arithmetic mean of the values of the internal radiuses R5, R6, R7, R8.

Using the signals 23 found by the segmented coils 31a, 31b, 31c, 31d and the signal 22 detected by the reception element 18, it is also possible to perform an estimation of a possible eccentricity of a tubular metal profile 12 measured.

Knowing the measurement of the mean values obtained with the reception element 18, it is in fact possible to calculate an eccentricity index, corresponding to the ratio between each value of the internal radiuses R5, R6, R7, R8 obtained with the segmented coils 31a, 31b, 31c, 31d and the value of the mean internal radius R3. For each segmented coil 31a, 31b, 31c, 31d it is therefore possible to obtain a non-dimensional value that contains the information on the thickness of the part of the metal profile 12 in the area under the corresponding segmented coil 31a, 31b, 31c, 31d.

If there are more than four segmented coils 31, as for example in FIG. 8, for each of them the calculus algorithm provides to find the corresponding internal radius and hence the mean radius and the eccentricity index.

The value obtained is linearly dependent on the modulus of eccentricity so that, by means of a simple linear function, it is possible to obtain from the non-dimensional index a number that is coherent with the sizes of the tube. The parameters that must be used in the linear function can be identified by means of a third level of calibration. Using this calculation, only an estimate of the internal radius can be obtained, and hence of the local thickness, but it can be enough to detect the presence of an eccentricity and a non-dimensional index which quantifies it to be able to control the process and to produce non-eccentric tubes.

The eccentricity vector can therefore be calculated starting from the mean internal radius R3, the internal radiuses R5, R6, R7, R8 and the mean external radius R4.

First of all are calculated the local wall thicknesses S5, S6, S7, S8 relating to each segmented coil 31a, 31b, 31c, 31d as the difference between the mean external radius R4 and the internal radiuses R5, R6, R7, R8.

Subsequently, the mean thickness S1 is also calculated, as the difference between the mean external radius R4 and the mean internal radius R3.

Finally, by subtracting from the four local wall thicknesses S5, S6, S7, S8 the mean wall thickness S1, it is possible to assess and define the components of the eccentricity vector, and therefore find the modulus and phase of said vector.

In this way, advantageously, it is possible to determine if the metal profile 12 measured is eccentric, and at the same time to quantify the entity of the eccentricity and what direction it faces, so as to be able to intervene during the rolling process to solve problems of misalignment.

The calibration of the device 10 comprises three distinct levels to obtain the corresponding parameters needed for the homographic transformation, for compensating the position and for detecting and estimating the eccentricity.

According to some embodiments, the first level of calibration provides to find three values relating to the magnetic flow in known conditions. The values can be found using two solid bars with different diameters, known with precision, and detecting the measurement of the flow with no metal profile 12 present in the device 10. According to some embodiments, the diameters of the bars used can be chosen so as to define the extremes of the field of measurement provided for a given measurer; the nominal value expected must therefore be comprised in the range thus defined. For example, if the nominal external diameter D is 100 mm, then the diameters of the bars used for calibration can be equal respectively to 80 mm and 120 mm.

According to some embodiments, the bars used have the same conductivity and are made of the same raw material.

The first level of calibration therefore consists of measuring the flow values at the lowest frequency F1 and the highest frequency F2 without anything inside the measuring device 10, and with two different solid reference bars.

According to some embodiments, the second level of calibration is used to assess a parameter that can be used for example to compensate the position of a metal profile 12 with respect to the nominal axis Z. For this purpose a measurement is made using a non-eccentric tube of known sizes, moved by a certain amount from the axis Z of the device 10. The parameter is determined by a minimum problem, with the aim of making the difference minimum between the compensated values of the flow on the segmented coils 31, 31a, 31b, 31c, 31d.

According to some embodiments, the third level of calibration provides to perform a measurement on a tube with known eccentricity, facing in a known direction. For example, according to embodiments described using FIG. 9, by putting in relation the internal radiuses R5, R7, obtained from the flows measured on the segmented coils 31a, 31c, with the values of internal radius R3 of the eccentric tube, the coefficients are obtained through linear interpolation for estimating and assessing the eccentricity.

According to some embodiments, the parameters obtained by means of the different levels of calibration can be memorized in the data storage unit 48 to be subsequently used for implementing the calculus algorithm.

It is clear that modifications and/or additions of parts may be made to the device for hot measuring, during rolling, a transverse size of metal profiles as described heretofore, without departing from the field and scope of the present invention.

It is also clear that, although the present invention has been described with reference to some specific examples, a person of skill in the art shall certainly be able to achieve many other equivalent forms of device for hot measuring, during rolling, a transverse size of metal profiles, having the characteristics as set forth in the claims and hence all coming within the field of protection defined thereby.

The invention claimed is:

1. A device for the hot measuring, during rolling, of a transverse size of a metal profile, comprising: a transmission element with at least two sections distinct and spatially separated from each other, disposed along a nominal axis of feed of the metal profile, and operating on a same nominal measurement of transverse size of the metal profile, said transmission element being configured to generate an electromagnetic field with a desired profile of force lines, and a reception element disposed along said nominal axis in a position comprised in an overall longitudinal measurement of said transmission element along said nominal axis and configured to detect a signal relating to variations of said electromagnetic field due to passage of said metal profile, wherein the two sections of the transmission element and also the reception element have a section shape defining a transit hole of a larger size than a diameter of the metal profile on which the hot measuring measurement is performed, and inside which the metal profile is made to transit, and wherein said transmission element and said reception element each include a coil with an extension along the nominal axis, said coils being of a cylindrical shape, and defining said transit hole.

2. The device as in claim 1, wherein said transmission element is substantially coaxial to said reception element along said nominal axis.

3. The device as in claim 1, wherein said reception element is a single section.

4. The device as in claim 1, wherein said reception element consists of two or more sections distinct and spatially separated from each other and disposed along said nominal axis of feed of the metal profile.

5. The device as in claim 1, comprising a plurality of segmented reception coils, each of the segmented reception coils corresponding to a relative sector obtained by dividing into equal parts a circular crown, each of the segmented reception coils disposed around disposed around the reception element.

6. The device as in claim 1, comprising a casing that surrounds at least said transmission element and said reception element, the casing configured to act as a screen to limit propagation of the electromagnetic field.

7. The device as in claim 6, comprising a thermostating system, configured so as to maintain a substantially uniform size and conductivity of the casing and stabilize a temperature of the casing.

8. An apparatus for the hot measuring, during rolling, of a transverse size of metal profiles, including a device as in claim 1, and further including a control and command unit, configured to power said device with electric power and to process the signals detected by said device.

9. The apparatus as in claim 8, wherein said control and command unit comprises a processing unit, configured to process the signals detected by said device and to implement a calculus algorithm to obtain at least the values of diameter, and/or average thickness and/or local thickness of the metal profile.

10. The apparatus as in claim 8, wherein said control and command unit comprises a data storage unit, configured to memorize data received from the device and parameters necessary for calibration of the device.

11. A method for the hot measuring, during rolling, of a transverse size of a metal profile comprising:
   generating an electromagnetic field with a desired profile of force lines using a transmission element with at least two sections distinct and spatially separated from each other and disposed along a nominal axis of feed of the metal profile, and operating on a same nominal measurement of transverse size of the metal profile;
   detecting a signal relating to the variations of said electromagnetic field due to the passage of said metal profile by means of a reception element disposed along said nominal axis in a position comprised in an overall longitudinal measurement of said transmission element along said nominal axis, wherein both of the two sections of the transmission element and also the reception element have a section shape defining a transit hole of a larger size than a diameter of the metal profile on which the measurement is performed, and inside which the metal profile is made to transit, and wherein said transmission element and said reception element each include consist of a coil with an extension along the nominal axis, said coils being of a cylindrical shape and defining said transit hole;

sending said signal to a control and command unit;

implementing using the control and command unit a calculus algorithm to obtain a measurement of at least one of an external diameter or an average thickness of said metal profile subjected to measurement on the basis of a power current of said transmission element and of the signal received.

12. The method as in claim 11, comprising:

detecting a signal relating to a flow of said electromagnetic field generated by means of segmented reception coils positioned around said reception element;

sending said signal related to the flow to said control and command unit;

implementing using said control and command unit a calculus algorithm to obtain a measurement of a local thickness of said metal profile subjected to measurement on the basis of the power current and of said signal related to the flow received.

13. The method as in claim 11, wherein said current is an alternate current obtained by overlapping at least two sinusoidal currents with different frequencies from each other, of which a first frequency is much greater than a second frequency.

\* \* \* \* \*